(12) United States Patent
Riall et al.

(10) Patent No.: US 7,494,305 B2
(45) Date of Patent: Feb. 24, 2009

(54) RASTER CUTTING TECHNOLOGY FOR OPHTHALMIC LENSES

(75) Inventors: James Daniel Riall, Roanoke, VA (US); Walter Dannhardt, Roanoke, VA (US); Roland Mandler, Heuchelheim (DE); Tobias Müller, Wettenberg (DE)

(73) Assignee: Essilor International (Compagnie Generale D'Optique), Charenton Cedex (FR)

( * ) Notice: Subject to any disclaimer, the term of this patent is extended or adjusted under 35 U.S.C. 154(b) by 400 days.

(21) Appl. No.: 10/910,674

(22) Filed: Aug. 3, 2004

(65) Prior Publication Data

US 2006/0026816 A1 Feb. 9, 2006

(51) Int. Cl.
*B23C 1/00* (2006.01)

(52) U.S. Cl. .............. 409/132; 409/80; 451/5; 451/11; 451/41; 451/42; 700/187; 700/193; 700/194

(58) Field of Classification Search ............. 409/132, 409/80; 700/176, 187, 193–194; 451/41–42, 451/5, 11; 29/564
See application file for complete search history.

(56) References Cited

U.S. PATENT DOCUMENTS

| | | | | |
|---|---|---|---|---|
| 4,850,761 A | * | 7/1989 | Breuer et al. | 409/132 |
| 4,945,487 A | * | 7/1990 | Kimura et al. | 700/160 |
| 5,231,587 A | * | 7/1993 | Frost | 451/5 |
| 5,354,961 A | * | 10/1994 | Diot et al. | 219/69.13 |
| 5,378,091 A | * | 1/1995 | Nakamura | 409/132 |
| 5,711,696 A | | 1/1998 | Maeda et al. | |
| 5,895,311 A | * | 4/1999 | Shiotani et al. | 451/5 |
| 6,077,002 A | * | 6/2000 | Lowe | 409/132 |
| 6,485,236 B1 | * | 11/2002 | Engeli et al. | 409/132 |

FOREIGN PATENT DOCUMENTS

| | | |
|---|---|---|
| DE | 4210381 | 10/1993 |
| EP | 0835722 | 4/1998 |
| JP | 2004098237 | 2/2002 |

OTHER PUBLICATIONS

International Search Report, Patent Cooperation Treaty, Jul. 12, 2005, 7 pages.

* cited by examiner

*Primary Examiner*—Erica E Cadugan
(74) *Attorney, Agent, or Firm*—Occhuiti Rohlicek & Tsao LLP

(57) ABSTRACT

A raster cutting apparatus and method for producing accurately formed, aspheric ophthalmic lenses having a good quality surface finish. The accurate form and good surface finish are obtained by using a substantially spherically shaped cutting tool having a large radius. The methods include utilizing a cutting path which provides substantially constant cutting-force, such as a constant surface-cutting-speed raster pattern.

28 Claims, 7 Drawing Sheets

RASTER CUTTING TECHNOLOGY FOR OPHTHALMIC LENSES

FIELD OF THE INVENTION

The present invention relates to machining high quality, three dimensional surfaces by cutting, and particularly to machining ophthalmic lenses by cutting using a constant cutting-force applied in a raster pattern.

BACKGROUND OF THE INVENTION

Cutting is used in the manufacture of ophthalmic lenses, particularly in producing customized progressive lenses which have aspheric surfaces and cannot be made by traditional optical polishing. There are, however, significant drawbacks to cutting lenses, primarily related to difficulties in controlling the surface shape to the required optical accuracy and to the quality of the surface finish.

To understand these drawbacks, it is useful to consider in some detail a conventional cutting lathe, and the spiral cutting action it uses to produce a surface geometry. A typical three-axis lathe is shown schematically in FIG. 1. A work-piece 10 is attached to a spindle 12 by a chuck 14 and rotated about the spindle axis 16 (also known as the "C" axis). The surface of work-piece 10 is shaped by moving a cutting tool 18 in toward axis 16 (along the "X-axis" direction), while adjusting its position in the "Z-axis" direction, parallel to the spindle axis 16. A Computer Numerical Controlled ("CNC") three-axis lathe may have traditional single point cutting tools, or multi-fluted, high-speed rotating cutters, similar to a milling machine. In both, the surface geometry is cut by the tool following a spiral cutting path, and the last piece of material to be cut is at the very center of the rotating work piece 10.

The lathe spindle 12 is typically rotated at a constant speed. This results in the surface-cutting-speed decreasing as the cutting tool 18 moves in toward the center of the work piece 10, with a corresponding change in the cutting force between the tool and the lens being formed. This change in cutting force introduces a gradual error into the shape of the surface being formed. Even if the lathe has a continuously variable spindle speed, it has an upper limit to that speed, and, therefore, a radius beyond which it is not possible to maintain a constant surface-cutting-speed. At that radius, the cutting force will change and the error will begin to be introduced.

Another problem is a characteristic center defect that occurs if the lens design requires removing material all the way to the center of the work piece 10. This center defect is a small depression, generated because the cutting force drops suddenly to zero when the final piece of material is removed. The cutting force bends the tip of the tool slightly away from the lens surface during cutting. When the force drops suddenly to zero, the cutting tool holder relaxes, and the tool moves in toward the still rotating lens, scooping out a small dimple at the lens center. Even high precision lathes produce center defects on the order of 1 to 5 microns deep, creating blemishes that are often visible and cosmetically undesirable.

In prism shaped lens designs in which the central region is flat, the sudden loss of cutting force occurs at a larger radius, but still has a noticeable effect in the form of a bump on the uphill side of the prism and a hole on the downhill side. The bump is typically about 2 microns high, and the hole is typically about 2 microns deep.

Because these loss-of-force defects are a complex function of tool sharpness, surface geometry, material properties and machine characteristics, they are essentially unpredictable. Attempts to compensate for them using software algorithms often produce worse defects.

Another problem in cutting lenses using a lathe stems from the quality of a cut surface being a function of cutting speed. For optimum efficiency, surface speed should be adjusted to produce the highest quality finish only at the lens radii where it is required. In traditional lathes, cutting speed is a fixed function of radius, and cannot be varied.

A further problem with lathes is that imperfections in the shape of the cutting tool (also know as "form imperfections") are transferred to the lens surface. A typical high-quality cutting tool used in a lathe is a single-point diamond chip, ground to a radius of about 2 mm. The accuracy of the edge of such a diamond is, however, only about 2 microns. This inaccuracy takes the form of scalloping (also known as "waviness") and is transferred directly on to the lens, i.e., a waviness defect of 2 microns on a cutting tool becomes a lens surface waviness defect of 2 microns. Waviness defects are completely unpredictable and cannot be compensated for by software. Controlled Waviness Tools are available at considerable cost. They also wear or chip quickly to a point where they are outside of specification, so their advantage is costly and short lived.

These cutting defects are traditionally overcome by polishing the cut lens, but this introduces a further deviation from optimal lens shape (also known as a "form error" in the lens surface). In practice, a compromise has to be made between the amount of form error introduced and the amount of the visible, cosmetic center defect that is removed.

Another traditional form of machining surfaces is milling. A typical milling machine is shown schematically in FIG. 2. FIG. 2a shows a side elevation in which a work piece 10 is held in a milling chuck 20 and moved in a raster pattern in the X-Y plane, while a rotating cutting tool 22 is moved up and down along the Z-axis. FIG. 2B is a plan view showing the raster pattern 24 that is the effective path of the cutting tool relative to the work piece 10. Although traditional milling allows independent control of surface cutting speed and position, and has no problems due to the cutting force suddenly dropping to zero, it produces very low quality surface finishes. FIG. 2C illustrates, in a magnified cross-section, that a typical mill cut surface 26 will frequently have a highly scalloped finish. The scalloping (also known as "waviness") of a milled surface is large, typically of the order of millimeters. For this reason, such raster cutting techniques have not traditionally been used in producing optics.

What is highly desirable for the efficient cutting of lenses, particularly customized progressive lens or other aspheric lens designs, is a method of cutting that can produce the required range of aspheric, three-dimension surfaces, and overcomes one or more of the surface quality problems associated with traditional cutting techniques.

BRIEF DESCRIPTIONS OF THE DRAWINGS

DETAILED DESCRIPTIONS OF THE PREFERRED EMBODIMENTS

Figure 1:
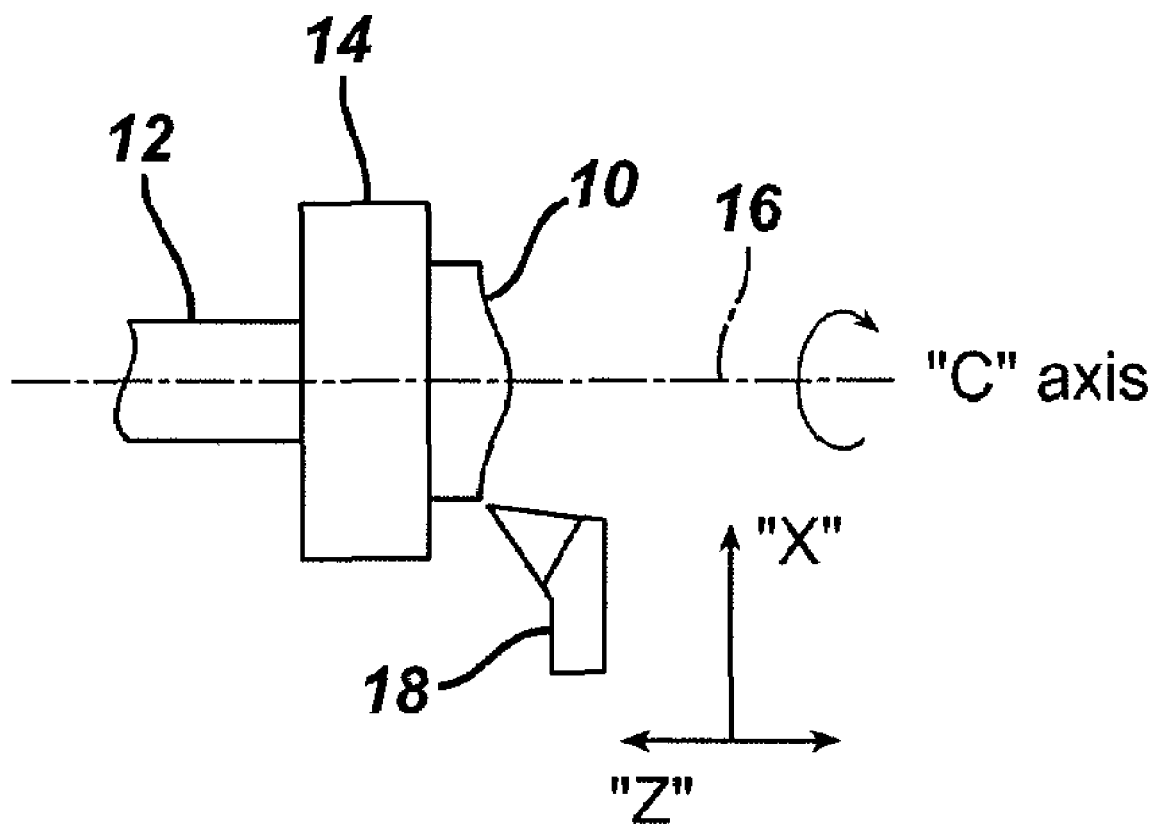
FIG. 1 is a schematic representation of a typical three-axis lathe.
Figure 2A:
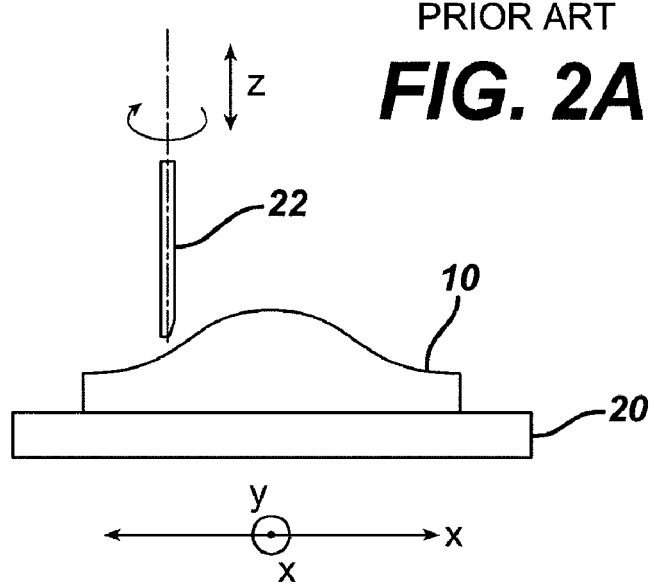
FIG. 2a is a schematic representation of a typical three-axis milling machine.
Figure 2B:
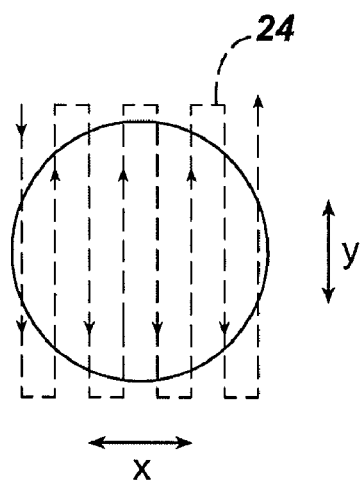
FIG. 2b is a schematic plan view of a raster cutting pattern.
Figure 2C:
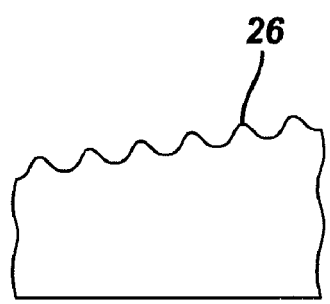
FIG. 2c is a schematic magnified cross-section of a scalloped surface cut by a typical three-axis milling machine cutting using a raster cutting pattern.

The present invention relates to a substantially constant surface cutting apparatus and methods capable of producing surfaces with a high degree of accuracy relative to a predetermined surface specification and with a surface finish that is of sufficiently high quality for use in the optical industry. Such cutting methods and devices are highly desirable in the optics industry, particularly as a cost-effective way to mass produce customized aspheric surfaces, as required in, for instance, the production of progressive spectacle lenses.

In certain preferred embodiments, the substantially constant cutting force apparatus comprises, consists essentially of and consists of a substantially spherically shaped cutting tool having a relatively large radius, preferably a radius of approximately 30 mm. The preferred method embodiments use the preferred cutting tool rotated about a spindle axis while being moved in a raster cutting pattern relative to the surface being formed. Because of the relatively large radius of the preferred cutting tool, the path of the cutting tool in such preferred methods is determined by calculating where the center of the cutting tool sphere must be for the point of contact between the work-piece being formed to lie substantially on the required, pre-determined three-dimensional surface. The cutting head is preferably then moved in a raster pattern by computer controlled servo-motors so that the center of the cutting head follows the required path.

In yet further preferred embodiments, the present methods compromise, consist essentially of, and consist of maintaining a substantially constant surface-cutting-speed for a substantial portion of the machine process, and even more preferably for substantially the entire machining process. In preferred embodiments, the maintaining step comprises, consists essentially of and consists of adjusting the rotational speed of the cutting tool. For instance, an effective radius of the cutting tool may be calculated for all cutting positions, and the rotational speed of the cutting tool adjusted so that the product of the effective radius and the rotational speed remains substantially constant throughout the machining process.

In still further embodiments, the methods of the invention comprise, consist essentially of, and consist of the step of moving the cutting tool at a substantially constant surface velocity. In preferred embodiments, this moving step comprises, consists essentially of, and consists of calculating a map of the contact points between the cutting tool sphere and the three-dimensional surface being cut, and ensuring that the time to travel between two successive contact points remains in substantially constant proportion to the distance between them.

Servomotor driven machinery that can move a cutting tool with very high precision is well-known. Such machinery can be computer controlled and can, for instance, produce a complex three-dimensional surface from a predetermined specification, generally in the form of a computer file, detailing the shape of the surface as a map of three-dimensional co-ordinates (also know as a "points file").

The present invention is well adapted for use with such computer driven, servomotor machinery and an appropriately shaped and accurate cutting tool, to provide a freeform surface cutting apparatus and method that is capable of producing surfaces that accurately conform to a required shape and have an optical-quality surface finish.

Figure 3:
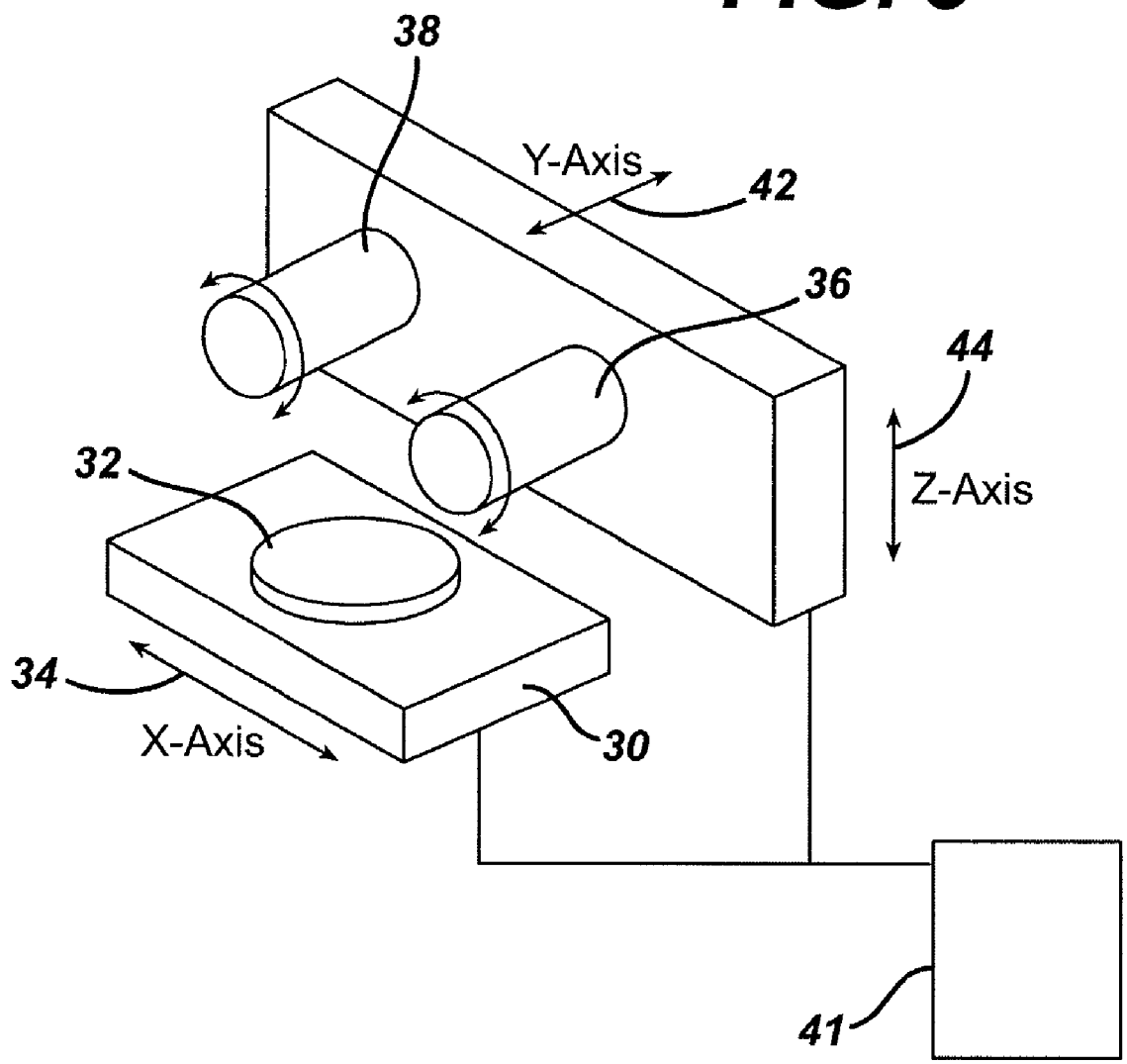
FIG. 3 is schematic representation exemplifying one embodiment of the cutting apparatus of the present invention.

Preferred embodiments of the present invention will now be described in detail with reference to the accompanying drawings in which like numbers describe like elements. FIG. 3 shows a schematic drawing of a three-axis, two-spindle computer controlled machining center in accordance with preferred embodiments of the present invention. The machine preferably comprises a lens holding stage 30 on which the lens 32 to be cut is mounted, a spindle holding stage 40 on which a rough cut spindle 36 and a fine cut spindle 38 are mounted, and a control module 41. Lens holding stage 30 is capable of precision, computer controlled motion in the direction of an X-axis 34. Spindle holding stage 40 is capable of precision, computer controlled motion in both a Y-axis 42 and a Z-axis 44 direction. In preferred embodiments, rough cut spindle 36 and fine cut spindle 38 are each capable of holding appropriate cutting tools and being rotationally driven at variable, high speed by appropriate electrical motors, under computer control. In a preferred embodiment, cutting heads mounted on either the rough cut spindle 36 or fine cut spindle 38 are adapted for movement, preferably under computer control, in the Z-axis 44 direction, while the stages are adapted for movement in a raster pattern in a plane parallel to the X-axis 34 and the Y-axis 42. This arrangement permits the cutting heads to produce a three-dimensional surface on the upper surface of lens 32. Control module 41, which may be any suitable computer module, is capable of calculating a cutting path of the cutting tool, or any point of the cutting tool, relative to the surface being cut on lens 32, and controlling servo-motors (not shown) to produce the required motions of stages 30 and 40. In preferred embodiments, rough cut spindle 36 holds a rough cut milling tool with poly-crystalline diamond ("PCD") bits, which are preferably of at least medium accuracy.

Figure 4:
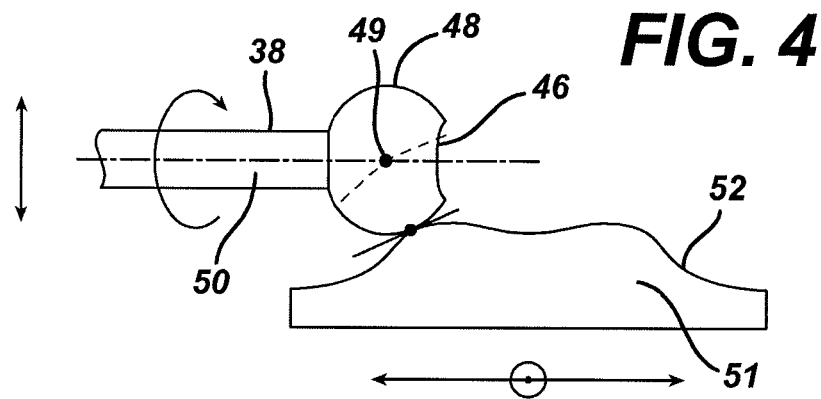
FIG. 4 is a schematic representation exemplifying one embodiment of the cutting method of the present invention.

FIG. 4 shows a fine cutting tool 46 used in a preferred embodiment of the present invention. The fine cutting tool 46 has an arcuate surface 48, and is attached to the fine cut spindle 38 capable of rotating around a spindle axis 50. In a preferred embodiment, the fine cutting tool 46 comprises a brass sintered diamond grinding wheel, preferably dressed to have an arcuate surface 48 of minimum waviness. In certain highly preferred embodiments, the arcuate surface 48 comprises at least a portion of a spherical surface, and even more preferably a portion of a spherical surface having a waviness of not greater than about 0.5 microns. As described below in more detail, dressing the fine cutting tool 46 is preferably automated and performed while it is attached to fine cutting spindle 38, reducing the cost of maintenance. Dressing of the cutting tool while it is attached to the cutting spindle (which is sometimes referred to herein as "on board, automated dressing") may be carried out by moving, and preferably rotating, the fine cutting tool 46 to a dressing station having a third rotating spindle. Other materials may also be used for the fine cutting tool 46 including, but not limited to, an electroplated diamond wheel, though not all of them may be dressable in-situ.

The surface to be cut 52 may be described by a set of three dimensional co-ordinates (also known as a "points file"), detailing the surface at a number of discrete points. Because the radius of cutting tool sphere 48 is large compared to the tool tip radius of conventional lathe turning tools, preferably at least about 20 mm, and therefore comparable to radii found in the surface 52, formed by the cutting process, significant errors would result if the cutting tool were simply to be moved so that the center or the tip of the tool follows a path that is substantially parallel to the desired surface, as is done in conventional CNC machining.

Figure 5:
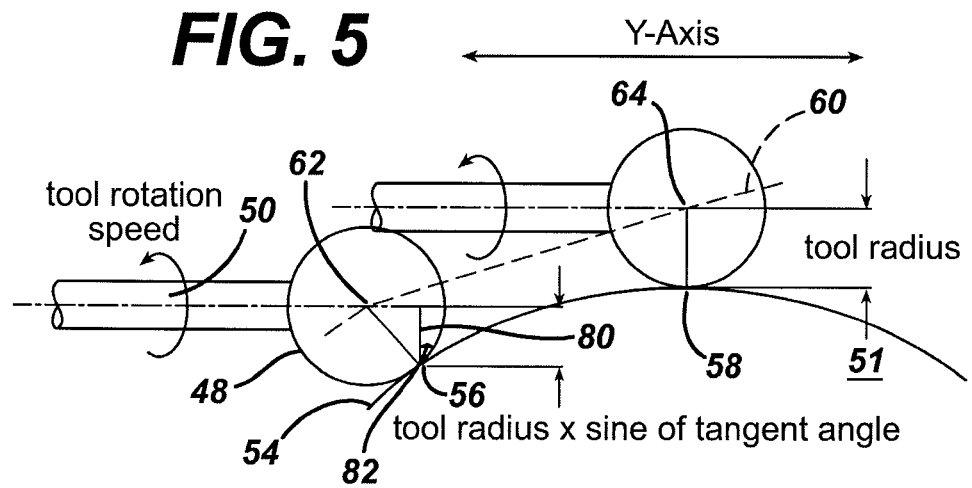
FIG. 5 is a schematic side-elevation showing the path of the cutting tool in one, exemplary embodiment of the present invention.

FIG. 5 shows a fine cutting tool of one embodiment of the invention at two positions during cutting a pre-defined three-dimensional surface 54. In the first position, the tool is cutting the surface 54 at point 56 and in a second position the tool is cutting surface 54 at point 58. From FIG. 5, it can be seen that the cutting path 60 that the center of the cutting tool 60 follows is related to the surface to be cut 54. The cutting path 60 can be calculated by, for instance, determining where a center point of a sphere of the same radius as the fine cutting tool spherical surface 48 would be if each contact point between the sphere and the work-piece 51 being cut lies substantially on the pre-defined three-dimensional surface 54 that is to be cut. For instance, the cutting path 60 passes through point 62, which is the position of the center of a sphere coincident with spherical surface 48 when the spherical surface 48 is in contact with point 56 of the required surface 54. Similarly the cutting path 60 passes through point 64, which is the position of the center of sphere 48 when it is in contact with point 58 of the required surface 54.

Figure 6:
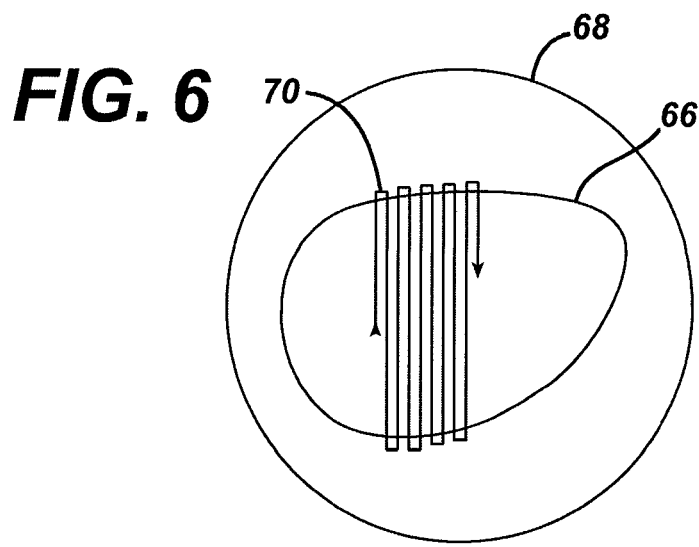
FIG. 6 is a plan view of a raster cutting pattern adjusted to cut a spectacle lens.

FIG. 6 shows a plan view of an ophthalmic lens 66 being cut by a fine cutting tool in an exemplary embodiment of the invention. Lens 66 is supported by stage 6, and the cutting point is moved over the surface in a raster pattern 70. In preferred embodiments, the present methods comprise the step of controlling the center of the cutting tool such that the point of contact between the sphere and the lens surface follows a substantially straight line. In certain embodiments, such as embodiments in which the variations exist in the radius of lens 66 being formed, the center of the cutting tool sphere 48 is preferably controlled to deviate slightly from a straight line in order that the point of contact between the sphere and the lens surface follow a straight line. In such embodiments, the cutting path is sometimes referred to a "drunken" line or "drunken" raster pattern. In order for the path of the point of contact between the cutting tool sphere 48 and the work-piece being cut 51 to be a raster pattern having straight lines in such embodiments, it is preferred that the methods include the step of calculating this "drunken" raster pattern of the center of the cutting tool sphere 48 and supplying control to the servo-motors driving platforms 30 and 40 based on this calculation.

Figure 11A:
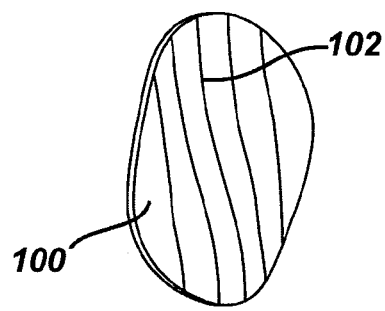
FIG. 11A is an isometric view of an aspheric surface on which straight line raster paths have been projected.
Figure 11B:
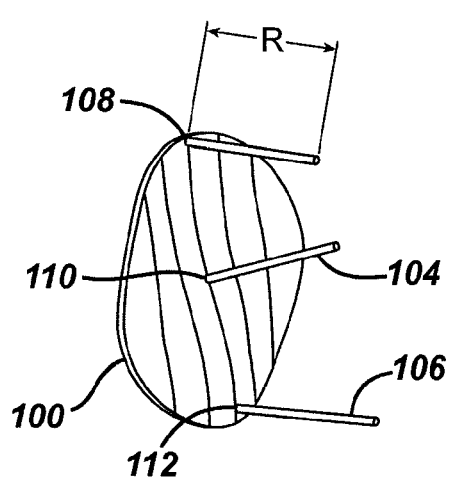
FIG. 11B is an isometric view of an aspheric surface showing a normal vector contacting the surface at three equally spaced points along a projected straight line raster path.
Figure 11C:
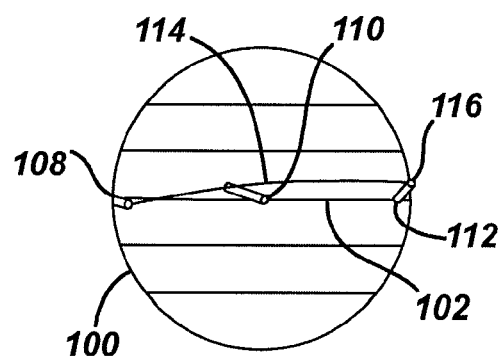
FIG. 11C is a plan view of an aspheric surface showing a "drunken line" that the center of the cutting tool follows in order to cut along a straight line.

FIGS. 11A-11C illustrate the "drunken" path in more detail. FIG. 11A is an isometric view of an aspheric surface 100 on which the required straight line raster paths 102 have been projected. FIG. 11B is an isometric view in which a vector 104 normal to the required surface 100 and having a length R equal to the radius of the of the cutting tool sphere 48 is shown. Accordingly, the vector end 106 is the position of the center of the cutting tool sphere 48. Vector 104 is shown contacting aspheric surface 100 at three equally spaced points 108, 110 and 112, along the straight line raster path 102 projected onto the aspheric surface 100. FIG. 11C is a plan view of aspheric surface 100, showing straight line raster paths 102 and the normal vector 104 contacting the surface 100 at the three equally spaced points 108, 110 and 112. The drunken line 114 is the path that the center of the cutting tool sphere 48 follows in order for the points of contact 108, 110 and 112 to be in a straight line.

A preferred embodiment of a lens cutting process in accordance with the present invention will now be described in connection with FIGS. 3-4. The required lens surface 52 is defined by a predetermined specification in the form of a computer points file. This computer file is translated by the computer according to known technique into a tool path file which is used to generate control signals which define a cutting path for the rough cutting tool and the fine cutting tool 46. The rough cutting tool, which may be mounted on rough cut spindle 36, cuts the lens based on its tool path file and the control signals created thereby, leaving a small, predefined amount of material to be removed by the fine cut tool 46. The machine preferably moves the rough cutting tool in a coordinated fashion, preferably using servomotors, to control table 30 and table 40 along the X, Y and Z axis. In the rough cut stage, high accuracy is generally not required. In one embodiment of the present invention, the rough cut may be done using a standard 3-axis lathe, since all the defects discussed previously are usually acceptable at the rough cut stage.

Many embodiments of the present invention rely on important aspects of the fine cut stage as described herein. In preferred embodiments, the present methods control the fine cut tool to follow a path, and preferably a computer generated CNC tool path, that is substantially a raster pattern. In many preferred embodiments, the cutting step cuts along a single linear axis, preferably with substantially all cuts being substantially equally spaced parallel lines. The X, Y and Z motions are preferably calculated, controlled and coordinated so that the contact point 56 of the spherical surface 48 of the cutting tool 46 moves across the surface of the lens, cutting material in substantially uniform, even rows. This substantially uniform material removal keeps the cutting loads substantially constant, thereby keeping the surface true to the desired surface, preferably as defined by a points file. For embodiments in which maximum efficiency is desired, the cutting step preferably cuts on both the fore and the back stroke. It is contemplated that the raster size may vary widely within the scope of the present invention and depends, for example, on how wavy the fine cut surface is permitted to be. In general the use of smaller raster sizes is preferred to achieve a less wavy surface, but the longer the process takes, and vice versa. Likewise, the speed of the stroke may vary widely within the scope of the present invention, depending on factors such as the desired rate of stock removal of the fine trim, the grit coarseness, the revolutions per minute (rpm) of the cutting tool, the cutting depth and the raster size, all in accordance with the teachings contained herein in combination with known engineering principles.

In certain preferred embodiments, the methods produce accurate freeform surfaces, preferably by maintaining substantially constant cutting forces with an arcuate-shaped cutting tool. Preferably, the step of maintaining a substantially constant cutting force removes a substantially constant volume of lens material per unit time. In many embodiments the use of a substantially constant cutting force step is important because single micron errors in lens surface shape can substantially change the function and cosmetic appearance of a lens. If the cutting forces remain constant, the system deflections remain constant, and the lens surface remains constant. In a preferred embodiment, the constant cutting force step cuts a substantially constant path width, preferably with a constant cutting path speed, and even more preferably with a substantially constant surface-cutting-speed.

Figure 7:
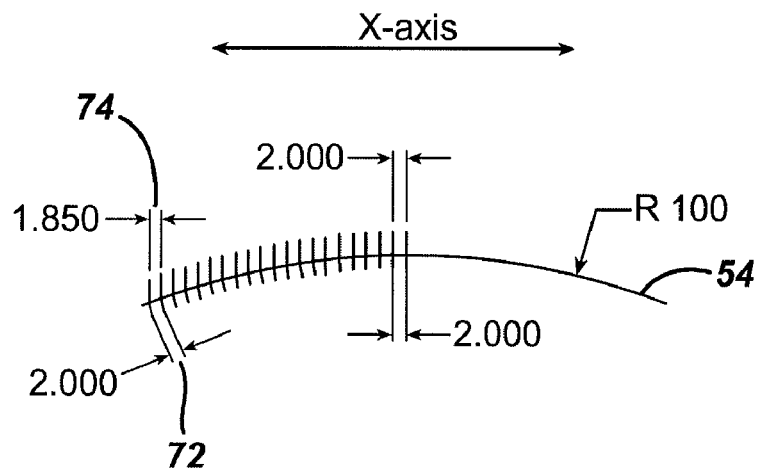
FIG. 7 is a schematic side-elevation showing constant surface steps along the X-axis direction.

FIG. 7 shows how the constant cutting path 72 is measured on the surface 54 being cut, and not in the rectilinear Cartesian coordinates, as is the distance 74. On complex lens shapes, such as toric lenses, the radius may be constantly changing, and for each instantaneous point, the radius must be calculated and used to determine the constant cut path 60 for the center of the spherical surface 48 of the fine cutting tool 46.

Figure 8:
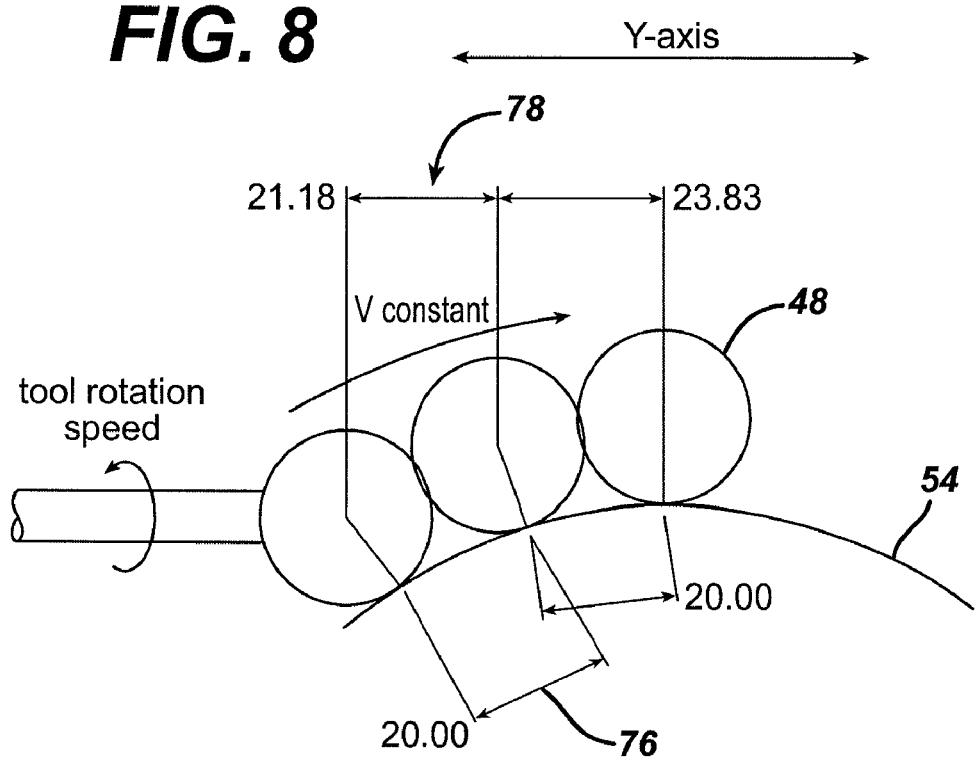
FIG. 8 is a schematic side-elevation showing constant surface steps along the Y-axis direction.

FIG. 8 shows how, in a preferred embodiment of the invention, constant cutting speed is maintained by measuring the distance covered 76 along the surface being cut 54 and not the distance 78 as measured in the Y-axis Cartesian co-ordinates. The rectilinear speed of the servomotors is adjusted so the velocity along the surface 54 is maintained constant.

FIG. 5 shows how in a preferred embodiment, the surface-cutting-speed of the fine cutting tool 46 is kept substantially constant. When cutting at surface point 56, the effective cutting radius 80 is the line normal to the fine spindle axis 50, from the axis to the point of contact 56. Alternatively, the effective cutting radius 80 can be calculated as the radius of sphere 48 multiplied by the sine of the tangent angle 82. When cutting at contact point 58, the effective cutting radius is the radius of the sphere. By altering the rate of rotation of the fine cutting tool so that the product of effective cutting radius times the rotational speed is kept constant, the surface-cutting-speed is kept constant. The effective radius can be found by taking a normal from the spindle axis to point at which cutting tool sphere contacts the three-dimensional surface being formed.

Figure 9:
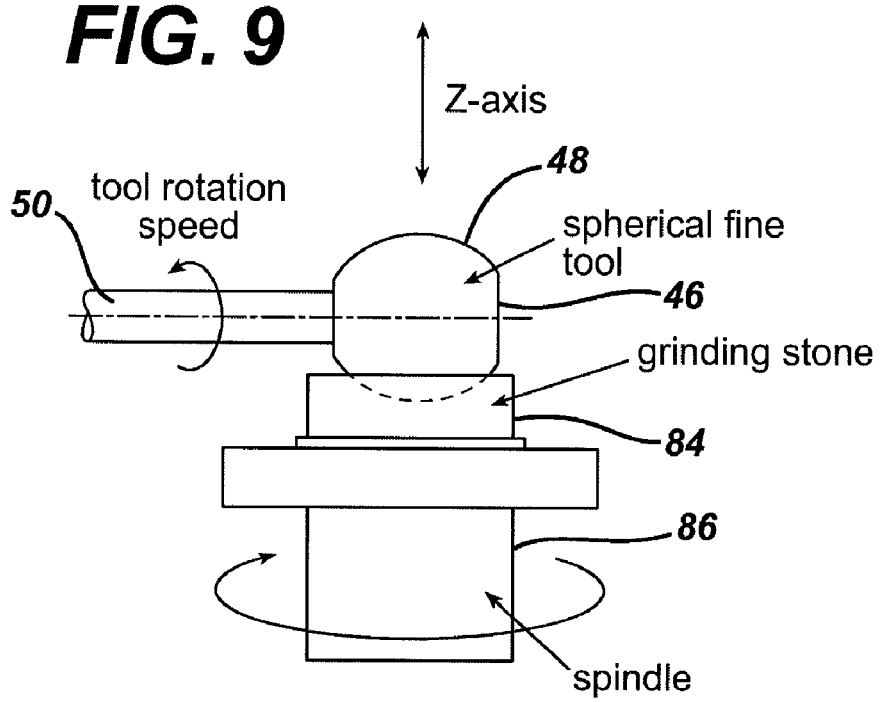
FIG. 9 is a schematic side-elevation showing a spherical tool dressing apparatus exemplifying one embodiment of the present invention.

In many embodiments the correct cutting path, the constant path width, the constant tool speed and the constant cutting speed all rely to some extent on calculating where the center of the cutting tool sphere 48 is with respect to the point of contact between the sphere and the surface being cut. It is important in many such embodiments, therefore, to maintain an accurately shaped and dimensioned cutting tool surface 48. FIG. 9 shows a preferred method of dressing the cutting tool 46 to maintain an accurate spherical surface 48. By dressing rotating surface 48 on grinding stone 84, which is rotated on spindle 86 that is orthogonal to fine tool spindle 50, surface 48 is keep accurately spherical, both in form and in surface finish.

In a preferred embodiment, the grinding stone 84 may be made of alumina. Grinding stone 84 is preferably rotated while simultaneously rotating sintered diamond spherical tool 46, and lowering tool 46 in the Z-axis direction, the two wear together to an accurate sphere. The final radius of the spherical surface 48 may be measured, either directly or indirectly by making a cutting impression into some lens material, and then using well known optical techniques of measuring spheres. Similarly the quality of the spherical surface can be measured using standard surface tracing techniques. The measured tool radius may then be used by the CNC machine to calculate the various required paths.

Figure 10:
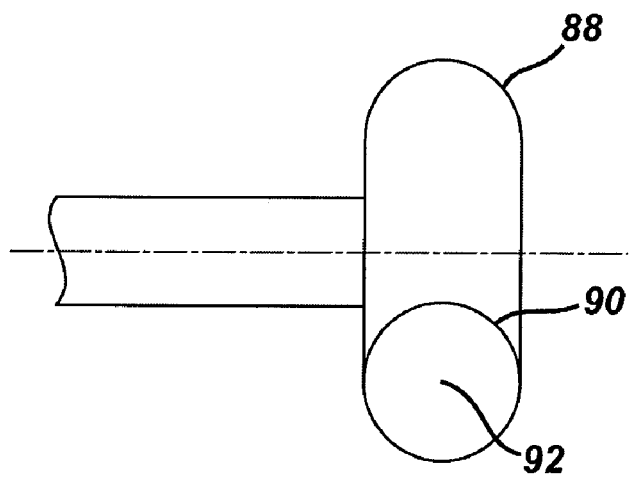
FIG. 10 is a schematic view of a toroidal cutting tool, exemplifying one embodiment of the present invention.

FIG. 10 shows an alterative embodiment in which the fine cutting tool 88 has a surface that is a portion of a toroid. The toroid has a minor circle 90, with a lowest center 92, which can be used in an equivalent manner, in accordance with the teachings contained herein, to the center of a sphere in calculating the various required cutting paths.

An additional benefit of the raster approach to cutting lenses is that only the shape of the lens required for the final product needs to be cut, as shown in FIG. 6. This contrasts with traditional lenses that are fully finished as round lenses, then trimmed to frame shape. Much of the cut and polished lens traditionally gets trimmed away when ground to fit the frame shape. Only cutting the final lens shape saves processing time and prevents inspectors rejecting a lens for a defect that will be trimmed away in its final configuration.

Although the invention has been described in language specific to structural features and methodological acts, it is to be understood that the invention defined in the appended claims is not necessarily limited to the specific features or acts described. Rather, the specific features and acts are disclosed as exemplary forms of implementing the claimed invention

What is claimed is:

1. A method of forming a three-dimensional surface on a workpiece, comprising:
   providing a spindle having a spindle axis;
   providing a cutting tool having a substantially spherical cutting surface;
   rotating said cutting tool about said spindle axis; and
   moving said cutting tool in a raster cutting pattern relative to the surface being formed, wherein the effective cutting radius of the point of contact between the cutting surface and the three-dimensional surface varies along the cutting pattern.

2. The method recited in claim 1, further comprising:
   determining the center of a sphere having an outer surface coinciding with said spherical cutting surface;
   calculating the position of the center of said sphere such that a point of contact between said sphere and said work piece lies substantially on said three-dimensional surface;
   placing said center of said spherical surface at said calculated position, thereby forming said three-dimensional surface.

3. The method recited in claim 2, further comprising:
   calculating an effective radius of said cutting tool, said effective radius being a length equal to a normal to said spindle axis from a point of said spindle axis to a point of contact between said cutting tool sphere and said three-dimensional surface; and
   adjusting a rotational speed of said spherical cutting tool such that a product of said rotational speed and said effective radius remains substantially constant.

4. The method recited in claim 2, further comprising
   calculating a plurality of contact points between said cutting tool sphere and said three dimensional surface, and
   wherein said moving said center further comprises moving such that a time to travel between two of said contact points is substantially in constant proportion to the distance between said two contact points.

5. The method recited in claim 2, wherein said raster pattern is substantially in a plane containing said spindle axis.

6. The method recited in claim 2, wherein achievement of said raster pattern comprises motion along a Y-axis, substantially parallel to said spindle axis and motion along an X-axis, substantially perpendicular to said spindle axis, and wherein contact between said cutting head sphere and said three-dimensional surface occurs only during said motion along an X-axis.

7. The method recited in claim 1, wherein said sphere has a radius greater than 20 mm.

8. The method recited in claim 1, wherein said cutting tool comprises a surface that is a portion of a toroid, and wherein a lowest center of a minor circle of said toroid acts equivalently to said center of a sphere.

9. An apparatus for forming a three-dimensional surface, comprising:
   a spindle having a spindle axis;
   a cutting tool having a substantially spherical cuffing surface;
   a support stage for holding a work-piece and capable of controlled three-dimensional motion relative to said cutting tool;
   a control module capable of calculating a cutting path comprising a raster pattern such that the effective cutting radius of the point of contact between the cutting surface and the three-dimensional surface varies along the raster pattern.

10. The apparatus recited in claim 9, wherein said control module is capable of calculating a cutting path comprising a plurality of positions of said center of said sphere when said cutting head sphere would be in contact with said three-dimensional surface, and
   wherein said control module is further capable of controlling said support stage and said cutting tool such that said center of said sphere follows said cutting path relative to said work piece.

11. The apparatus recited in claim 10, further comprising a rotational drive means, capable of rotating said cutting tool at a variable rotational speed; and
   wherein said control module is further capable of calculating an effective radius of said cutting tool, said effective radius being a length equal to a normal to said spindle axis from a point of said spindle axis to a point of contact between said cutting tool sphere and said three-dimensional surface; and adjusting said rotational speed such that a product of said rotational speed and said effective radius is substantially constant.

12. The apparatus recited in claim 10, wherein said control module is further capable of calculating a plurality of contact points between said cutting tool sphere and said three-dimensional surface, and wherein said cutting path further comprises a tool speed adjusted such that a time to travel between two of said contact points is substantially in constant proportion to the distance between said two contact points.

13. The apparatus recited in claim 9, wherein said raster pattern occurs substantially in a plane containing a spindle axis.

14. The apparatus recited in claim 9, wherein the achievement of said raster pattern comprises motion along a Y-axis, substantially parallel to said spindle axis and motion along an X-axis, substantially perpendicular to said spindle axis, and wherein contact between said cutting head sphere and said three-dimensional surface occurs only during said motion along an X-axis.

15. The apparatus recited in claim 9, wherein said sphere has a radius greater than 20 mm.

16. The apparatus recited in claim 9, wherein said cutting tool comprises a surface that is a portion of a toroid, and wherein a lowest center of a minor circle of said toroid acts equivalently to said center of a sphere.

17. A machine-readable medium embodying a computer program for causing a computing system to:
   control three-dimensional motion of a support stage for holding a work-piece relative to a cutting tool; and
   calculate a cutting path for said cutting tool, said cutting tool having a substantially spherical cutting surface, the cutting path comprising a raster pattern, and wherein the effective cutting radius of the point of contact between the cutting surface and the work-piece varies along the raster pattern.

18. A method comprising:
   determining control information for controlling a rotating cutting tool for forming a three-dimensional surface on a work-piece, the cutting tool having an arcuate cutting surface with a varying cutting radius that varies along an axis of rotation of the cutting tool, wherein determining the control information includes
   determining a trajectory of the cutting tool relative to the work-piece such that points of contact between the cutting surface and the three-dimensional surface form a desired path along the three-dimensional surface, wherein the effective cutting radius of the point of contact on the cutting surface varies along the desired path, wherein the desired path comprises a raster pattern.

19. The method of claim 18 wherein determining the control information further includes determining speed of the cutting tool for varying along the determined trajectory to achieve a desired cutting speed along the desired path.

20. The method of claim 19 wherein the desired cutting speed comprises a substantially constant cutting speed.

21. The method of claim 18 wherein determining the control information further includes determining rotation speed of the cutting tool for varying as the tool passes along the determined trajectory to achieve a desired surface cutting speed at the point of contact of the cutting surface.

22. The method of claim 21 wherein the desired surface cutting speed comprises a substantially constant surface cutting speed.

23. The method of claim 18 wherein determining the control information further includes determining speed of the cutting tool for varying as the point of contact passes along the desired path to achieve a desired cutting force.

24. The method of claim 23 wherein the desired cutting force comprises a substantially constant cutting force.

25. The method of claim 23 wherein determining the speed of the cutting tool includes at least one of determining varying speed of the tool along the determined trajectory and determining rotation speed of the cutting tool for varying as the tool passes along the determined trajectory.

26. The method of claim 18 wherein the desired path comprises substantially equally spaced parallel lines on the three-dimensional surface.

27. The method of claim 26 wherein the desired path comprises a three-dimensional raster pattern.

28. The method of claim 18 further comprising providing the cutting tool and controlling the cutting tool according to the determined control information.

* * * * *